United States Patent
Floch (10) Patent No.: US 9,612,337 B2
(45) Date of Patent: Apr. 4, 2017

(54) ANTENNA BEAM FORMING FOR TRACKING A TRANSMITTER SIGNAL

(75) Inventor: Jean-Jacques Floch, Munich (DE)

(73) Assignee: ASTRIUM GMBH, Taufkirchen (DE)

(*) Notice: Subject to any disclaimer, the term of this patent is extended or adjusted under 35 U.S.C. 154(b) by 1059 days.

(21) Appl. No.: 13/483,893

(22) Filed: May 30, 2012

(65) Prior Publication Data
US 2012/0319902 A1 Dec. 20, 2012

(30) Foreign Application Priority Data
Jun. 15, 2011 (EP) .................................. 11004867

(51) Int. Cl.
| | | |
|---|---|---|
| G01S 19/22 | (2010.01) | |
| H01Q 3/26 | (2006.01) | |
| G01S 19/23 | (2010.01) | |
| H04B 7/08 | (2006.01) | |
| H04B 17/21 | (2015.01) | |

(52) U.S. Cl.
CPC ............. *G01S 19/22* (2013.01); *G01S 19/23* (2013.01); *H01Q 3/2605* (2013.01); *H01Q 3/267* (2013.01); *H04B 7/086* (2013.01); *H04B 17/21* (2015.01)

(58) Field of Classification Search
CPC ....... G01S 19/23; G01S 19/22; H01Q 3/2605; H01Q 3/267; H04B 17/0062; H04B 17/007; H04B 7/086; H04B 17/21
See application file for complete search history.

(56) References Cited

U.S. PATENT DOCUMENTS 6,058,318 A * 5/2000 Kobayakawa et al. .... 455/562.1
6,727,846 B1   4/2004 Brown
(Continued)

FOREIGN PATENT DOCUMENTS

| EP | 2 293 103 | 3/2011 |
|---|---|---|
| GB | 2 418 537 | 3/2006 |
| GB | 2418536 A * | 3/2006 |

OTHER PUBLICATIONS

Harrison, David M., "Error Analysis in Experimental Physical Science", Jul. 28, 2004, Department of Physics, University of Toronto.*

(Continued)

*Primary Examiner* — Cassie Galt
(74) *Attorney, Agent, or Firm* — Greenblum & Bernstein, P.L.C.

(57) ABSTRACT

Receiver using antenna beam forming for tracking a transmitter signal and method for tracking the transmitter signal. The receiver includes a beam forming network comprising at least one beam forming channel for weighting each of N signals received from an N-element antenna array with an assigned weighting factor for forming a beam for tracking a transmitter signal of a certain transmitter, and a calibrator structured and arranged to calibrate the weighting factor (Wi) assigned to a signal (i) selected from the N signals by determining an average phase difference ($\Delta\Phi$) between consecutive samples of the selected signal and consecutive samples of a reference signal and structured and arranged to adapt the weighting factor (Wi) of the selected signal depending on the determined average phase difference ($\Delta\Phi$), where (i) is a number between 1 and N.

19 Claims, 3 Drawing Sheets

(56) References Cited

U.S. PATENT DOCUMENTS

| | | | |
|---|---|---|---|
| 2004/0266483 A1* | 12/2004 | Choi | H01Q 3/267 455/562.1 |
| 2010/0009644 A1* | 1/2010 | Izumi | H04B 7/086 455/132 |
| 2010/0285752 A1 | 11/2010 | Lakshmanan et al. | |
| 2011/0050489 A1 | 3/2011 | Maenpa et al. | |

OTHER PUBLICATIONS

Dr. Alison Brown et al., "A GPS Digital Phased Array Antenna and Receiver", IEEE Phased Array Symposium, Dana Point, CA, May 2000.

European Office Action conducted in counterpart European Appln. No. 11 004 867.5-2220 (Nov. 15, 2011).

* cited by examiner

ANTENNA BEAM FORMING FOR TRACKING A TRANSMITTER SIGNAL

CROSS-REFERENCE TO RELATED APPLICATIONS

The present application claims priority under 35 U.S.C. §119(a) of European Patent Application No. 11 004 867.5-2220 filed Jun. 15, 2011, the disclosure of which is expressly incorporated by reference herein in its entirety.

BACKGROUND OF THE INVENTION

1. Field of the Invention

The invention relates to a receiver using antenna beam forming for tracking a transmitter signal and a method for tracking a transmitter signal by using antenna beam forming.

2. Discussion of Background Information

Multipath propagation can be a relevant error source in positioning and navigation using a positioning and navigation system such as a GNSS (Global System for Satellite Navigation), particularly in areas with a high fraction of signal reflections such as in urban areas with large buildings. Due to multipath propagation, receivers for navigation signals transmitted by a positioning and navigation system, herein also called navigation receivers, receive reflected electromagnetic waves from transmitters such as satellites (indirect navigation signals), which can cause multipath interference with direct navigation signals. Such multipath interference limits the speed and accuracy of the position determining by a navigation receiver.

In order to overcome the problem of multipath interference, navigation receivers can reject received navigation signals with a low signal to noise ratio (SNR) since these signals are often indirect navigation signals having a much lower SNR than the direct navigation signals. However, this technique is not reliable since indirect navigation signals with a small incidence angle may have a SNR similar to that of directly received navigation signals.

Instead of detecting indirect navigation signals based on their SNR, special antennas can be used to "filter" indirect navigation signals. For example, signals from (NAVSTAR-) GPS (Global Positioning System) are clockwise circular polarized electromagnetic waves, which are changed into counter-clockwise circular polarized waves if they are reflected by metallic surfaces. Thus, antennas adapted to receive only clockwise circular polarized electromagnetic waves can be applied in order to reject indirect GPS signals reflected from metallic surfaces. However, indirect GPS signals reflected from non-metallic surfaces cannot be detected and rejected.

Another technique to reject indirect navigation signals is the application of highly directional antennas with a directional receiving pattern, which does not approximate the horizontal plane, thus not being able to receive indirect navigation signals with a small incidence angle. However, this technique has drawbacks for example in street canyons in cities since indirect navigation signals have in these areas an incidence angle comparable to that of direct navigation signals.

Instead of rejecting indirect navigation signals based on receiving techniques, signal processing methods may be used for an efficient rejection. For example, the PRN (Pseudo-Random-Noise) sequences of a received direct and indirect navigation signal can be compared. If the time difference of two compared navigation signals is larger than the clock period in the navigation receiver, the delayed navigation signal can be rejected. However, if the time difference of two navigation signals is smaller than the clock period, it can be difficult to decide whether to reject one of the navigation signals.

New techniques use antenna arrays in order to significantly improve navigation performances, in terms of multipath and interference rejection. The usage of an antenna array in a navigation receiver is one the most promising techniques to get rid of multipath problems, interferences and at the same time to have a very good signal to noise ratio. A navigation receiver employing an antenna array forms the reception beam of the antenna array towards the direction of a target transmitter of a navigation signal, particularly a GNSS satellite, in order to be able to track the direct navigation signal. The beam-forming process is based on the weighting of the received signal samples of each individual antenna array element with pointing direction dependent complex excitation coefficients (for amplitude and phase). If the pointing varies with the time, these excitation coefficients can vary accordingly. A GPS Receiver using a digital beam-steering antenna array to enable up to eight GPS satellites to be tracked is described in the publication "A GPS Digital Phased Array Antenna and Receiver", Dr. Alison Brown, Randy Silva, Proceedings of IEEE Phased Array Symposium, Dana Point, Calif., May, 2000.

SUMMARY OF INVENTION

Embodiments of the invention provide an improved antenna beam forming for tracking a transmitter signal.

The improved antenna beam forming according to the embodiments of the invention is based on a synchronization of receiver chains, which can be automatically performed during operation of a receiver, and, thus, allows to significantly improve the performance of a receiver using antenna beam forming. A receiver using antenna beam forming with an antenna array for tracking a transmitter signal comprises for each antenna element a receiver chain. A receiver chain comprises an antenna element of the antenna array and a cable or a wiring from the antenna element to the analogue and digital RF (Radio Frequency) frontend. In order to efficiently track a transmitter signal from a specific transmitter, the formed antenna beams should be directed to the transmitter as precise as possible. The direction of the formed antenna beam is influenced by the synchronization of the receiver chains with regard to the phase of signals processed in the receiver chains, and the synchronization depends on the adjustment of the complex excitation coefficients or weighting factors assigned to the receiver chains. In order to insure that all the receiver chains are synchronized, the receiver can be calibrated in an anechoic chamber, but in a real environment, aging and temperature variation may affect this synchronization and the tracking performances may be even worse than by using a single antenna. Thus, the present invention provides a calibration mechanism for calibrating weighting factors assigned to signals received via elements of the antenna array or the receiver chains for insuring a synchronization of the chains. This calibration mechanism allows optimally adjusting the antenna beam forming for signals to be received and tracked from specific transmitters. The mechanism is based on adjusting weighting factors of a receiver chain depending on a determined phase difference between a selected signal from a receiver chain to be calibrated and a reference signal. The inventive calibration mechanism may be used to automatically synchronize during an operation mode of the receiver all the receiver chains with regard to a direction of a formed antenna beam. The transmitter signal may be a navigation signal transmitted by a specific transmitter such as a satellite of a GNSS.

An embodiment of the invention relates to a receiver using antenna beam forming for tracking a transmitter signal. The receiver includes a beam forming network having at least one beam forming channel for weighting each of N signals received from a N-element antenna array with an assigned weighting factor for forming a beam for tracking a transmitter signal of a certain transmitter, and a calibrator for calibrating the weighting factor assigned to a signal selected from the N signals by determining an average phase difference between consecutive samples of the selected signal and consecutive samples of a reference signal and adapting the weighting factor of the selected signal depending on the determined average phase difference.

The receiver can be implemented, e.g., in a chip-set for GNSS receiver devices. The chip-set receives as input the output of an antenna array of the GNSS receiver devices.

The calibrator receives samples of the N signals and may include a reference beam former for multiplying the received samples of the N signals with a vector comprising a weighting factor of a signal selected as the reference signal and for outputting consecutive samples of the selected reference signal, a synchronization alignment beam former for multiplying the received samples of the N signals with a vector comprising a weighting factor of the selected signal and for outputting consecutive samples of the selected signal, and a calibration receiver for determining the average phase difference between the consecutive samples of the selected signal and the consecutive samples of the reference signal and for adapting the weighting factor of the selected signal if the determined average phase difference exceeds a threshold.

The calibration receiver may be configured to adapt the weighting factor of the selected signal by multiplying it by $e^{j\Delta\Phi}$. The term $\Delta\Phi$ is a determined average phase difference and j is an imaginary unit. Thus, the selected signal can be synchronized upon weighting to the reference signal.

The calibrator may be adapted for selecting a transmitter signal received from a transmitter with a high elevation angle as the reference signal. Such a reference signal has the advantage of being less influenced by multipath and interference and, therefore, can serve as reference for an optimization of the beam forming.

The receiver may further include pre-computed weighting factors for beam forming. The pre-computed weighting factors may be for example computed based on a calibration of the receiver a in an anechoic chamber, i.e. in a nearly ideal environment without multipath and interference effects and influences.

The calibrator may be adapted for sequentially calibrating the weighting factors assigned to the N signals. This allows automatically synchronizing all receiver chains of the antenna array.

A further embodiment of the invention relates to a receiver device for positioning and navigation, particularly a GNSS positioning and navigation device. The receiver includes an antenna array for receiving navigation signals, a receiver using antenna beam forming according to the above-described embodiments for tracking a navigation signal from a certain transmitter, and navigation signal tracker and data demodulator for processing the signal data output by the beam forming network of the receiver and for outputting demodulated navigation data received with tracked navigation signal.

Particularly, this device can significantly improve positioning and navigation in areas influenced by multipath and interference such as urban areas.

A yet further embodiment of the invention relates to a method for tracking a transmitter signal by using antenna beam forming. The method includes weighting each of N signals received from a N-element antenna array with an assigned weighting factor for forming a beam for tracking a signal of a certain transmitter, and calibrating the weighting factor assigned to a signal selected from the N signals by determining an average phase difference between consecutive samples of the selected signal and consecutive samples of a reference signal and adapting the weighting factor of the selected signal depending on the determined average phase difference.

The calibrating may include receiving samples of the N signals, multiplying the received samples of the N signals with a vector comprising a weighting factor of a signal selected as the reference signal and for outputting consecutive samples of the selected reference signal, multiplying the received samples of the N signals with a vector comprising a weighting factor of the selected signal and for outputting consecutive samples of the selected signal, determining the average phase difference between the consecutive samples of the selected signal and the consecutive samples of the reference signal, and adapting the weighting factor of the selected signal if the determined average phase difference exceeds a threshold.

The adapting the weighting factor of the selected signal may include multiplying the selected signal by $e^{j\Delta\Phi}$, where $\Delta\Phi$ is the determined average phase difference and j is the imaginary unit.

The calibrating may further include selecting a transmitter signal received from a transmitter with a high elevation angle as the reference signal.

The calibrating may be sequentially performed for calibrating the weighting factors assigned to the N signals.

A further embodiment of the invention relates to a computer program, which implements a method according to the above-described embodiments and enables an efficient tracking of a transmitter signal by using antenna beam forming when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention relates to a computer being configured by a computer program of the invention and as described before for tracking a transmitter signal by using antenna beam forming. The computer may be for example receive navigation signals received with an antenna array and process the received navigation signals by tracking one or more navigation signals from specific transmitters by beam forming, thus allowing to efficiently detect and track navigation signals under bad reception conditions particularly caused by multipath reception such as in urban areas with large buildings and a plurality of reflected navigation signals.

Embodiments of the invention are directed to a receiver using antenna beam forming for tracking a transmitter signal. The receiver includes a beam forming network comprising at least one beam forming channel for weighting each of N signals received from an N-element antenna array with an assigned weighting factor for forming a beam for tracking a transmitter signal of a certain transmitter, and a calibrator structured and arranged to calibrate the weighting factor (Wi) assigned to a signal (i) selected from the N signals by determining an average phase difference (ΔΦ) between consecutive samples of the selected signal and consecutive samples of a reference signal and structured and arranged to adapt the weighting factor (Wi) of the selected signal depending on the determined average phase difference (ΔΦ), where (i) is a number between 1 and N.

According to embodiments of the instant invention, the calibrator can receive samples of the N signals and can include a reference beam former structured and arranged to multiply the received samples of the N signals with a vector (W1) comprising a weighting factor (W1) of a signal selected as the reference signal and for outputting consecutive samples of the selected reference signal, a synchronization alignment beam former structured and arranged to multiply the received samples of the N signals by a vector (Wi) comprising a weighting factor (Wi) of the selected signal (i) and for outputting consecutive samples of the selected signal, and a calibration receiver for determining the average phase difference (ΔΦ) between the consecutive samples of the selected signal and the consecutive samples of the reference signal and to adapt the weighting factor (Wi) of the selected signal if the determined average phase difference (ΔΦ) exceeds a threshold. Further, the calibration receiver is structured and arranged to adapt the weighting factor (Wi) of the selected signal by multiplying it by $e^{j\Delta\Phi}$, where ΔΦ is the determined average phase difference and j is the imaginary unit.

In accordance with other embodiments, the calibrator may be structured and arranged to select a transmitter signal received from a transmitter with a high elevation angle as the reference signal.

According to other features of the embodiments, the receiver further includes pre-computed weighting factors for beam forming.

In accordance with still other embodiments of the invention, the calibrator may be structured and arranged to sequentially calibrate the weighting factors (Wi) assigned to the N signals (i).

According to still other embodiments, a receiver device for positioning and navigation includes the receiver using antenna beam forming of the above-noted embodiments for tracking a navigation signal from a transmitter. The receiver device can include an antenna array structured and arranged to receive navigation signals, and a navigation signal tracker and data demodulator structured and arranged to process the signal data output by the beam forming network of the receiver and to output demodulated navigation data received with tracked navigation signal.

Embodiments of the invention are directed to a method for tracking a transmitter signal by using antenna beam forming. The method includes weighting each of N signals received from an N-element antenna array with an assigned weighting factor for forming a beam for tracking a signal of a certain transmitter, and calibrating the weighting factor (Wi) assigned to a signal (i) selected from the N signals by determining an average phase difference (ΔΦ) between consecutive samples of the selected signal and consecutive samples of a reference signal and adapting the weighting factor (Wi) of the selected signal depending on the determined average phase difference (ΔΦ).

According to other embodiments of the instant invention, the calibrating can include receiving samples of the N signals, multiplying the received samples of the N signals with a vector (W1) comprising a weighting factor (W1) of a signal selected as the reference signal and for outputting consecutive samples of the selected reference signal, multiplying the received samples of the N signals with a vector (Wi) comprising a weighting factor (Wi) of the selected signal (i) and for outputting consecutive samples of the selected signal, determining the average phase difference (ΔΦ) between the consecutive samples of the selected signal and the consecutive samples of the reference signal, and adapting the weighting factor (Wi) of the selected signal if the determined average phase difference (ΔΦ) exceeds a threshold. Further, the adapting the weighting factor (Wi) of the selected signal can include multiplying the selected signal by $e^{j\Delta\Phi}$, where ΔΦ is the determined average phase difference and j is the imaginary unit.

In accordance with still other embodiments, the calibrating may further include selecting a transmitter signal received from a transmitter with a high elevation angle as the reference signal.

According to other embodiments, the calibrating can be sequentially performed for calibrating the weighting factors (Wi) assigned to the N signals.

Moreover, in embodiments, a computer program can implement the method of the above-described embodiments. Moreover, a computer product can include a non-transitory medium storing the computer program. Further, a computer can execute the computer program to track a transmitter signal by using antenna beam forming.

Embodiments of the invention are directed to a computer program for tracking a transmitter signal, the computer program being stored on a non-transitory medium and being executable by a computer having a processor for executing computer code. The computer program includes code for weighting N signals received from an N-element antenna array with an assigned weighting factor for forming a beam for tracking a signal of a transmitter, and code for calibrating the weighting factor (Wi) assigned to a signal (i) selected from the N signals by determining an average phase difference (ΔΦ) between consecutive samples of the selected signal and consecutive samples of a reference signal and adapting the weighting factor (Wi) of the selected signal depending on the determined average phase difference (ΔΦ).

In accordance with still yet other embodiments of the present invention, the code for calibrating may include code for receiving samples of the N signals, code for multiplying the received samples of the N signals with a vector (W1) comprising a weighting factor (W1) of a signal selected as the reference signal and for outputting consecutive samples of the selected reference signal, code for multiplying the received samples of the N signals with a vector (Wi) comprising a weighting factor (Wi) of the selected signal (i) and for outputting consecutive samples of the selected signal, code for determining the average phase difference (ΔΦ) between the consecutive samples of the selected signal and the consecutive samples of the reference signal and code adapting the weighting factor (Wi) of the selected signal if the determined average phase difference (ΔΦ) exceeds a threshold. Further, the code for adapting the weighting factor (Wi) of the selected signal comprises code for multiplying the selected signal by $e^{j\Delta\Phi}$, where ΔΦ is the determined average phase difference and j is the imaginary unit.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the following, functionally similar or identical elements may have the same reference numerals. The described embodiments of the invention relate to the tracking of navigation signals from a GNSS. However, it should be noted that the present invention is in principle applicable for the tracking of any kind of signal and not restricted to the tracking of navigation signals from a GNSS. For example, also signals from transmitters such as on board of airplanes or on earth could be tracked with the present invention.

The embodiments of the present invention relate to a GNSS receiver using antenna beam forming for tracking code multiplexed navigation signals transmitted from GNSS satellites. For the transmission of the navigation signals, a CDMA (Code Division Multiple Access) method for code multiplexing the navigation signals is used. However the present invention can be used with any other multiple access method and is not limited to code multiplexed navigation signals as used by GPS or the planned European GNSS Galileo. Instead of CMDA, navigation signals can also be transmitted using FDMA (Frequency Division Multiple Access) or TDMA (Time Division Multiple Access).

As will be described in more detail later, the inventive receiver comprises a beam-forming network that is structured and arranged to form the reception beam of the antenna array toward the direction of a target transmitter from which a navigation signal should be tracked. The beam-forming process is based on the weighting of the received signal samples of each individual antenna array element with pointing direction dependent complex excitation coefficients (for amplitude and phase). As the pointing varies with the time, these excitation coefficients will vary accordingly. Another term used in the context of the present invention for the excitation coefficients is weighting factors.

As outlined above, the embodiments of the invention as described in the following refer to code multiplexed navigation signals requiring correlation on the receiver side for decoding the navigation signal to be received and processed. In principle, the beam forming in a GNSS receiver for code multiplexed navigation signals can be done pre- or post-correlation of the received navigation signals. In the following description, only beam forming pre-correlation is considered even if the present invention may also be used with post-correlation beam forming. Post-correlation is more complex than pre-correlation since the beam forming requires for each antenna array element one or more correlators so that the number of correlators is equivalent to the number of array elements multiplied by the number of signals to be tracked and by the number of correlator inputs needed for a code and carrier discriminator.

Figure 1:
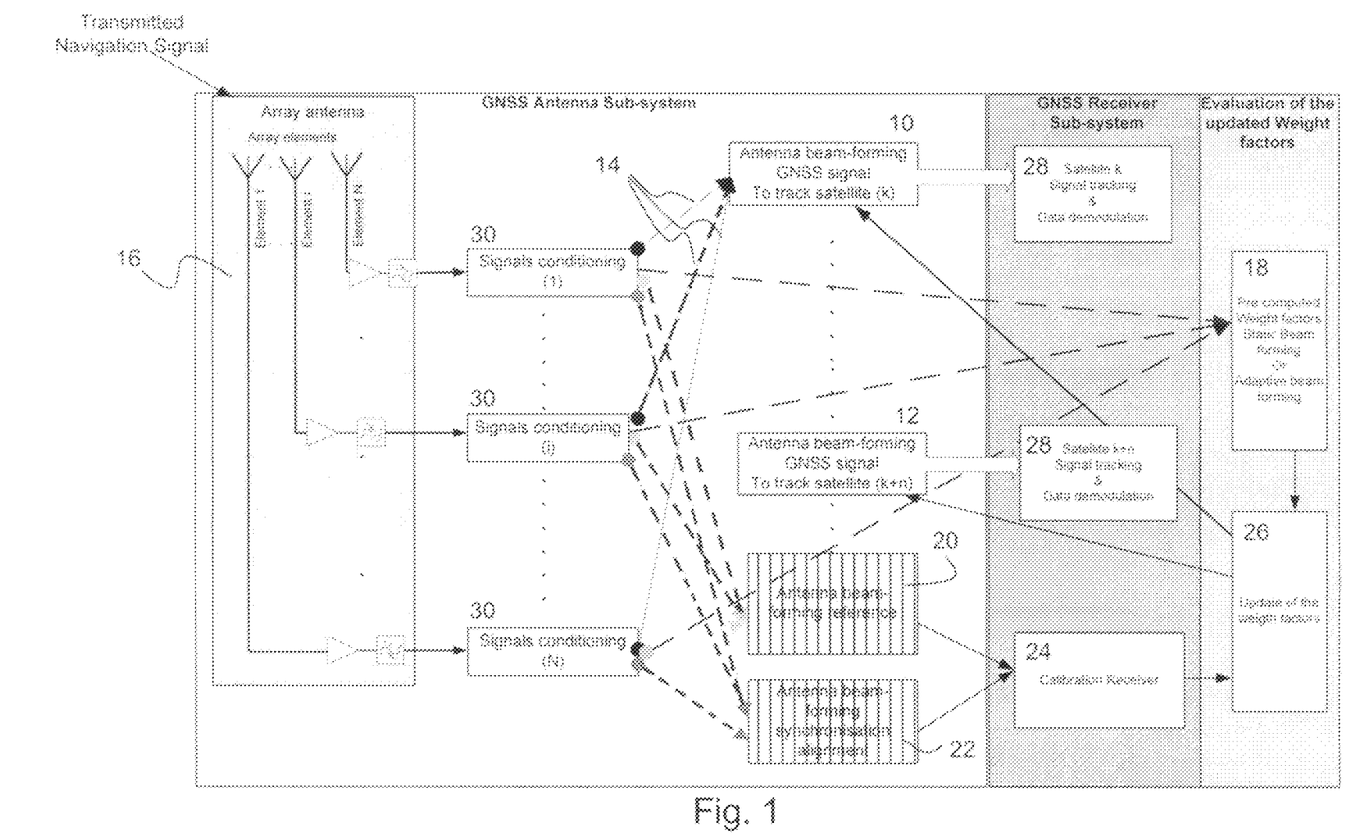
FIG. 1 shows a block diagram of an embodiment of a GNSS receiver according to the invention.

FIG. 1 shows the architecture of a receiver device for positioning and navigation via GNSS signals using pre-correlation beam forming. A navigation signal transmitted from a GNSS satellite is received by N antenna elements of an array antenna 16 of the receiver device. It is then filtered, down-converted, digitized and equalized in each of the N signal (chain) conditioner 30 of the GNSS antenna subsystem. Thus, the antenna array 16 outputs N signals, each corresponding to the received GNSS signal.

The GNSS antenna subsystem further comprises a beam forming network having n beam forming channels 10, 12 for tracking the navigation signals from n different satellites (k) . . . (k+n). A beam forming channel 10, 12 digitally processes digital samples received from the signal conditioner 30. Each beam forming channel 10, 12 receives the outputted samples from all signal conditioner 30, i.e. from each antenna element 1-N.

The beam-forming process applied for each satellite to be tracked includes a weighting of the signal samples from each antenna element 1-N, i.e. a weighting of N signals corresponding to the signal samples from the N antenna elements. The weighting factors 18 for the beam forming may have been pre-computed off-line (static beam forming) or may be calculated onboard of the receiver (adaptive beam forming); the calculations on board are often evaluated with an algorithm based on a covariance matrix obtained with digital samples from all the receiver chains. The digital samples used to evaluate the covariance matrix are dominated by noise and interference; therefore, it cannot be used for the synchronization of the different receiver chains.

The signal tracked from a satellite and output by a beam forming channel 10, 12 is processed in the GNSS receiver sub-system by a signal tracker and demodulator 28 in order to demodulate the navigation data received with a tracked GNSS signal. The navigation data can then be used for positioning, i.e. determining the actual position of the receiver device on earth and for navigation.

The GNSS antenna subsystem includes two further beam formers 20 and 22 provided for synchronizing automatically and onboard the receiver chains. The two extra beam formers 20 and 22 are linked to the GNSS receiver with two tracking channels including carrier wipe off, correlator, code and carrier discriminator, code/carrier loop filter and code/carrier NCO (Numeric Controlled Oscillator) as shown in FIG. 2 in detail.

The first beam former 20 (reference beam former) serves as antenna beam-forming reference, while the second beam former 22 (synchronization alignment beam former) performs antenna beam-forming synchronization alignment with the reference. The outputs of the two beam formers 20 and 22 are supplied to a calibration receiver 24 of the GNSS receiver sub-system. The calibration receiver 24 outputs update signals to a weighting factor updater 26, which updates and outputs the updated weighting factors to the beam-forming channels 10, 12.

Figure 2:
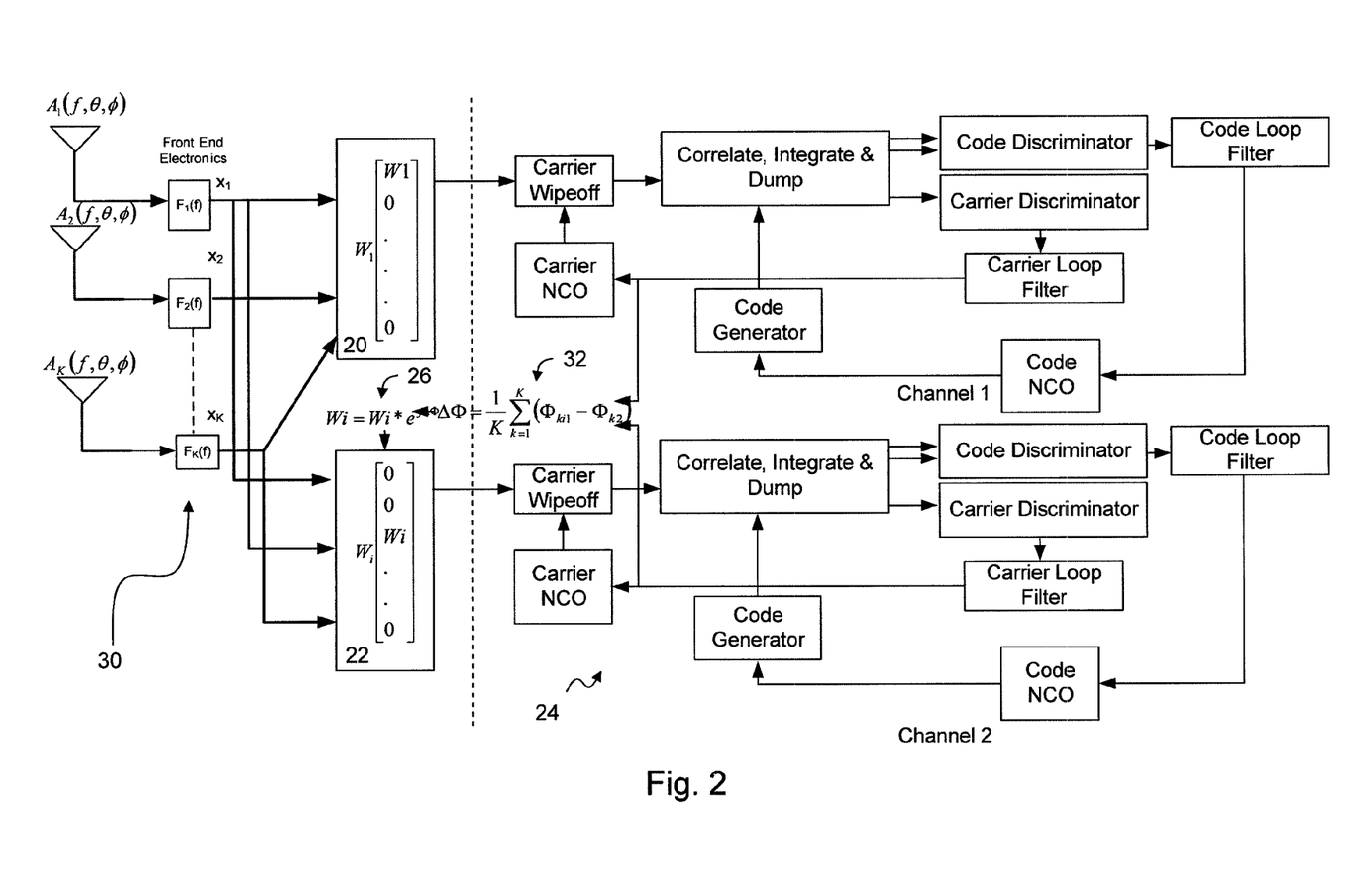
FIG. 2 shows a block diagram of the calibration receiver of the GNSS receiver of FIG. 1.
Figure 3:
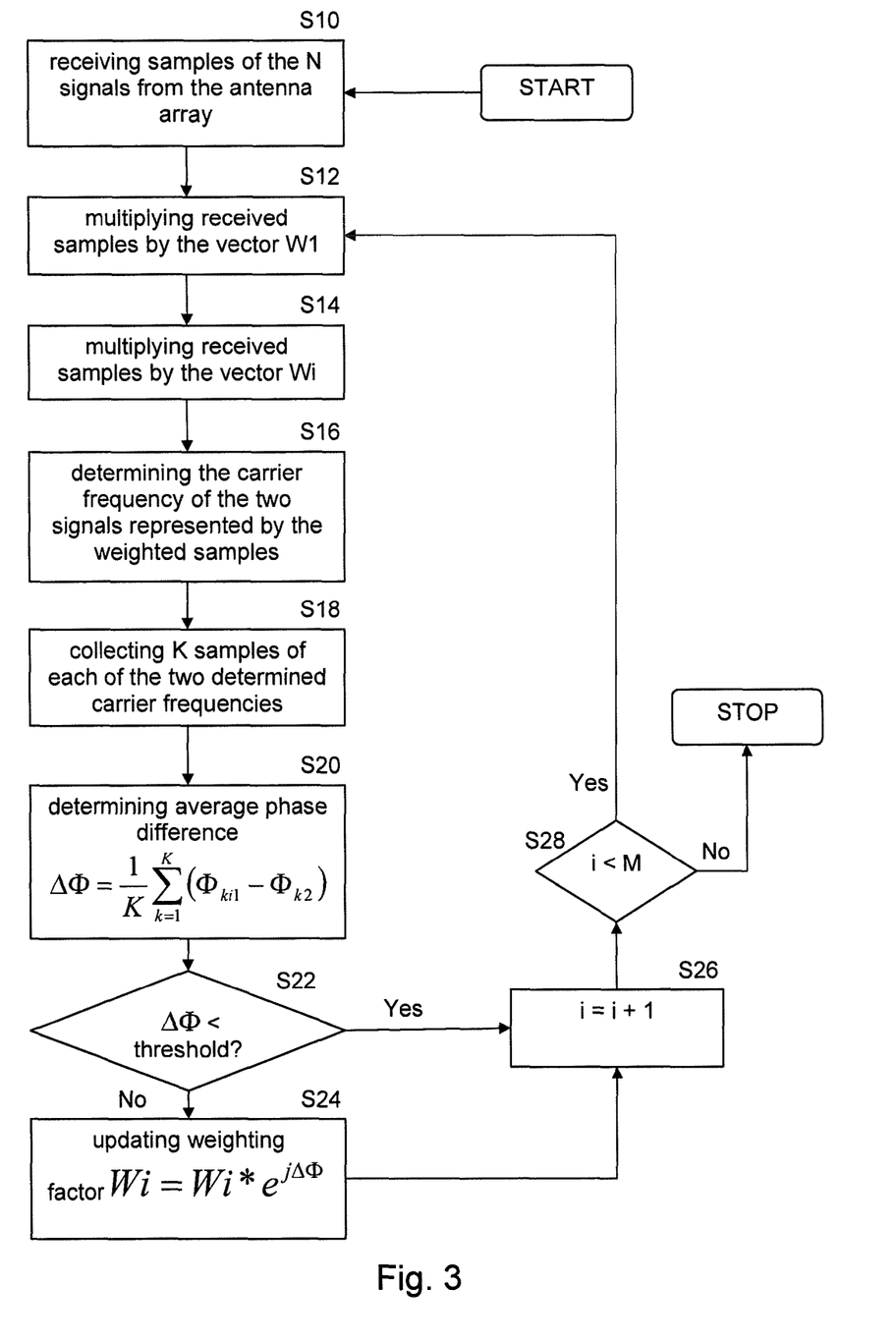
FIG. 3 shows a flowchart of an embodiment of the calibration process of the method for tracking a transmitter signal by using antenna beam forming according to the invention.

The signal processing performed by the two beam formers 20 and 22 and the calibration receiver 24 is now explained with regard to FIG. 2, showing an embodiment of the beam formers 20 and 22 and of the calibration receiver 24, and FIG. 3, showing an embodiment of the calibration receiver implemented for example in software.

The principle to align two receiver chains, receiver chain (1) considered as the reference and the receiver chain to be aligned (i) (FIG. 1), will be explained in the following:

The reference beam former 20 receives digital samples from the N receiver chains (step S10 in FIG. 3), and multiplies them by the vector $$\begin{pmatrix} W1 \\ 0 \\ \vdots \\ \vdots \\ 0 \end{pmatrix}$$

(step S12 in FIG. 3). W1 is the weighting factor for the receiver chain (1) either pre computed (static mode) or computed onboard (adaptive beam forming) to track the signal transmitter (T). The signal from the transmitter, which is received by the receiver chain to be synchronized, should be a signal with a high elevation angle, i.e., a signal transmitted from a satellite with a high elevation angle so that multipath effects and interferences are small for this signal taken as the reference for synchronization.

The synchronization alignment beam former 22 receives digital samples from the N receiver chains (step S10 in FIG. 3), and multiplies them by the vector:

$$\begin{pmatrix} 0 \\ 0 \\ Wi \\ \vdots \\ 0 \end{pmatrix}$$

step S14 in FIG. 3). Wi is the weighting factor for the receiver chain (i) either pre computed (static mode) either computed onboard (adaptive beam forming) to track the transmitter (T).

The two streams with weighted signal samples are then transmitted from the beam formers 20 and 22 to the calibration receiver 24, which comprises two channels (1) and (2) provided for processing the streams of weighted signal samples.

The digital samples from the reference beam former 20 are tracked in the channel (1) of the calibration receiver 24 and the digital samples from the synchronization alignment beam former 22 are tracked in channel (2) of the calibration receiver 24. Both channels (1) and (2) are identical and process the samples as usually performed in GNSS receivers for demodulating and decoding the navigation signals. During the processing, the carrier frequency of each received GNSS signal is determined after correlation, integration, discrimination via a carrier loop filter, which controls a carrier NCO for carrier wipe off (step S16 in FIG. 3).

For calibration and synchronization, K consecutive outputs of the carrier NCO of channel (1) and K consecutive outputs of the carrier NCO of channel (2) are collected (step S18 in FIG. 3). An average of the phase differences is then evaluated with the following formula (step S20 in FIG. 3):

$$\Delta\Phi = \frac{1}{K}\sum_{k=1}^{K}(\Phi_{ki1} - \Phi_{k2})$$

Depending on the evaluated average phase difference $\Delta\Phi$, it is decided whether the weighting factor Wi has to be adjusted for synchronization or not (step S22):

If the average phase difference $\Delta\Phi$ is less or equal than a threshold, for example one millimeter, the two receiver chains are considered synchronized.

If the average phase difference $\Delta\Phi$ is larger than the threshold, for example one millimeter, all the data samples coming from the receiver chain (i) are multiplied by the factor $e^{j\Delta\Phi}$ to be synchronized with the receiver chain (1).

In FIG. 2, as an example, this is just applied for the tracking of the transmitter (T). If it was determined that a synchronization of receiver chain (i) is required due to a large average phase difference $\Delta\Phi$, the phase of the weighting factor for receiver chain (i) is updated by the weighting factor updater 26 as follows (step S24 in FIG. 3):

$$Wi = Wi * e^{j\Delta\Phi}$$

Once the receiver chain (i) is synchronized with receiver chain (1), it can proceed sequentially to the synchronization of the M−1 receiver chains with the receiver channel (1), refer to steps S26 and S28 in FIG. 3. It is considered that M array elements are visible for the signal transmitter.

In order to be able to complete the synchronization with the remaining N-M receiver chains, one or more satellites with high elevation angle will be considered. The same process as the one previously described will be applied. As the reference receiver chain, one receiver chain which has already been synchronized should be taken. This process can be applied continuously insuring permanently and automatically the synchronization of all the receiver chains. All the receiver chains are then synchronized, and the receiver may provide high code/carrier performances for all the tracked transmitters.

The invention allows synchronizing automatically all the receiver chains of a receiver using antenna beam forming, particularly a GNSS receiver. This synchronization is very precise as it uses the carrier phase for the synchronization. As a difference is made between the two channels, there is no problem of ambiguity. Moreover, if the transmitted signal taken as reference for calibration and synchronizing the receiver chains is received with a high elevation, the carrier phase error due to multipath is very limited.

This invention allows using antenna array techniques for accurate transmitter signal tracking such as for tracking satellite signals with a GNSS based navigation receiver, and can insure that all receiver chains of an antenna array are automatically synchronized.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and wireless networking represent examples of the state of the art. Such standards are periodically superseded by faster or more efficient equivalents having essentially the same functions. Accordingly, replacement standards and protocols having the same functions are considered equivalents.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS 10 beam forming channel for tracking the navigation signal of satellite (k)
12 beam forming channel for tracking the navigation signal of satellite (k+n)
14 samples of navigation signals received via the antenna array 16
16 antenna array comprising array elements 1-N
18 complex excitation coefficients (weighting factors) for beam forming
20 reference beam former
22 synchronization alignment beam former
24 calibration receiver
26 weighting factor updater
28 signal tracker and demodulator
30 signal conditioner
32 average phase difference determiner

What is claimed:

1. A receiver using antenna beam forming for tracking a transmitter signal, the receiver comprising:
a beam forming network comprising at least one beam forming channel for weighting each of N signals received from an N-element antenna array with an assigned weighting factor for forming a beam for tracking a transmitter signal of a certain transmitter; and
a weighting factor calibrator comprising a calibration receiver, the weighting factor calibrator being configured to calibrate the weighting factor (Wi) assigned to a signal (i) selected from the N signals by determining an average phase difference ($\Delta\Phi$) between consecutive samples of the selected signal and consecutive samples of a reference signal selected from the N signals and configured to adapt the weighting factor (Wi) of the selected signal depending on the determined average phase difference ($\Delta\Phi$), where (i) is a number between 1 and N,
wherein the weighting factor calibrator is configured to select, as the reference signal, a transmitter signal received from a transmitter with an elevation angle such that multipath effects and interferences are substantially avoided.

2. The receiver of claim 1, wherein the weighting factor calibrator receives samples of the N signals and comprises:
a reference beam former configured to multiply the received samples of the N signals with a vector comprising a weighting factor (W1) of the selected reference signal and for outputting consecutive samples of the selected reference signal; and
a synchronization alignment beam former configured to multiply the received samples of the N signals by a vector comprising a weighting factor (Wi) of the selected signal (i) and for outputting consecutive samples of the selected signal,
wherein the calibration receiver is configured for determining the average phase difference ($\Delta\Phi$) between the consecutive samples of the selected signal and the consecutive samples of the selected reference signal and to adapt the weighting factor (Wi) of the selected signal if the determined average phase difference ($\Delta\Phi$) exceeds a threshold.

3. The receiver of claim 2, wherein the calibration receiver is configured to adapt the weighting factor (Wi) of the selected signal by multiplying it by $e^{j\Delta\Phi}$, where $\Delta\Phi$ is to is the determined average phase difference and j is the imaginary unit.

4. The receiver of claim 1, further comprising a memory containing pre-computed weighting factors for beam forming.

5. The receiver of claim 1, wherein the weighting factor calibrator is configured to sequentially calibrate the weighting factors (Wi) assigned to the N signals (i).

6. A receiver device for positioning and navigation that includes the receiver using antenna beam forming according to claim 1 for tracking a navigation signal from a transmitter, the receiver device comprising:
an antenna array structured and arranged to receive navigation signals; and
a navigation signal tracker and data demodulator structured and arranged to process a signal data output by the beam forming network of the receiver and to output demodulated navigation data received with tracked navigation signal.

7. A method for tracking a transmitter signal by using antenna beam forming, the method comprising:
weighting each of N signals received from an N-element antenna array with an assigned weighting factor for forming a beam for tracking a signal of a certain transmitter; and calibrating the weighting factor (Wi) assigned to a signal (i) selected from the N signals by determining an average phase difference (ΔΦ) between consecutive samples of the selected signal and consecutive samples of a reference signal selected from the N signals and adapting the weighting factor (Wi) of the selected signal depending on the determined average phase difference (ΔΦ), wherein the calibrating further comprises selecting, as the reference signal, a transmitter signal received from a transmitter with an elevation angle such that multipath effects and interferences are substantially avoided.

8. The method of claim 7, wherein the calibrating comprises:
receiving samples of the N signals;
multiplying the received samples of the N signals with a vector comprising a weighting factor (W1) of the selected reference signal and outputting consecutive samples of the selected reference signal;
multiplying the received samples of the N signals with a vector comprising a weighting factor (Wi) of the selected signal (i) and outputting consecutive samples of the selected signal;
determining the average phase difference (ΔΦ) between the consecutive samples of the selected signal and the consecutive samples of the selected reference signal; and
adapting the weighting factor (Wi) of the selected signal if the determined average phase difference (ΔΦ) exceeds a threshold.

9. The method of claim 8, wherein the adapting the weighting factor (Wi) of the selected signal comprises multiplying the selected signal by $e^{j\Delta\Phi}$, where ΔΦ is the determined average phase difference and j is the imaginary unit.

10. The method of claim 7, wherein the calibrating is sequentially performed for calibrating the weighting factors (Wi) assigned to the N signals.

11. A tangible, non-transitory computer readable medium storing a computer program executable by a processor to perform the method of claim 7.

12. A computer product comprising a non-transitory medium storing the computer program according to claim 11.

13. A computer executing the computer program of claim 11 to track a transmitter signal by using antenna beam forming.

14. A tangible, non-transitory computer readable medium storing code executable by a processor of a computer to perform transmitter signal tracking operations, the computer readable medium storing executable code comprising:
code for weighting N signals received from an N-element antenna array with an assigned weighting factor for forming a beam for tracking a signal of a transmitter; and
code for calibrating the weighting factor (Wi) assigned to a signal (i) selected from the N signals by determining an average phase difference (ΔΦ) between consecutive samples of the selected signal and consecutive samples of a reference signal and adapting the weighting factor (Wi) of the selected signal depending on the determined average phase difference (ΔΦ),
wherein the code for calibrating the weighting factor is configured to select, as the reference signal, a transmitter signal received from a transmitter with an elevation angle such that multipath effects and interferences are substantially avoided.

15. The computer readable medium of claim 14, wherein the code for calibrating comprises:
code for receiving samples of the N signals;
code for multiplying the received samples of the N signals with a vector comprising a weighting factor (W1) of a signal selected as the reference signal and for outputting consecutive samples of the selected reference signal;
code for multiplying the received samples of the N signals with a vector comprising a weighting factor (Wi) of the selected signal (i) and for outputting consecutive samples of the selected signal;
code for determining the average phase difference (ΔΦ) between the consecutive samples of the selected signal and the consecutive samples of the selected reference signal; and
code adapting the weighting factor (Wi) of the selected signal if the determined average phase difference (ΔΦ) exceeds a threshold.

16. The computer readable medium of claim 15, wherein the code for adapting the weighting factor (Wi) of the selected signal comprises code for multiplying the selected signal by $e^{j\Delta\Phi}$, where ΔΦ is the determined average phase difference and j is the imaginary unit.

17. A receiver using antenna beam forming for tracking a transmitter signal, the receiver comprising:
a beam forming network comprising at least one beam forming channel for weighting each of N signals received from an N-element antenna array with an assigned weighting factor for forming a beam for tracking a transmitter signal of a certain transmitter; and
a weighting factor calibrator, comprising a reference beam former, a synchronization alignment beam former and a calibration receiver, the weighting factor calibrator being configured to calibrate the weighting factor (Wi) assigned to a signal (i) selected from the N signals by determining an average phase difference (ΔΦ) between consecutive samples of the selected signal and consecutive samples of a reference signal selected from the N signals and configured to adapt the weighting factor (Wi) of the selected signal when the determined average phase difference (ΔΦ) exceeds a predetermined threshold, where (i) is a number between 1 and N,
wherein the weighting factor calibrator is configured to select, as the reference signal, a transmitter signal received from a transmitter with an elevation angle such that multipath effects and interferences are substantially avoided.

18. The receiver of claim 17, wherein the weighting factor calibrator receives samples of the N signals,
wherein the reference beam former is configured to multiply the received samples of the N signals with a vector comprising a weighting factor (W1) of the selected reference signal and for outputting consecutive samples of the selected reference signal;
wherein the synchronization alignment beam former is configured to multiply the received samples of the N signals by a vector comprising a weighting factor (Wi) of the selected signal (i) and for outputting consecutive samples of the selected signal; and
wherein the calibration receiver is configured for determining the average phase difference (ΔΦ) between the consecutive samples of the selected signal and the consecutive samples of the selected reference signal and to adapt the weighting factor (Wi) of the selected signal if the determined average phase difference (ΔΦ) exceeds a threshold.

19. A method for operating the receiver according to claim 1 to track the transmitter signal, the method comprising:
weighting each of the N signals received from the N-element antenna array of the beam forming network with the assigned weighting factor for forming the beam for tracking the signal of the certain transmitter; and
calibrating the weighting factor (Wi) assigned to the signal (i) selected from the N signals in the weighting factor calibrator by:
  receiving samples of the N signals from the N-element antenna array;
  multiplying the received samples of the N signals with a vector comprising a weighting factor (W1) of the selected reference signal and outputting consecutive samples of the selected reference signal;
  multiplying the received samples of the N signals with a vector comprising a weighting factor (Wi) of the selected signal (i) and outputting consecutive samples of the selected signal; and
  determining the average phase difference (ΔΦ) between the consecutive samples of the selected signal and the consecutive samples of the selected reference signal; and
when the determined average phase difference (ΔΦ) exceeds a threshold, adapting the weighting factor (Wi) of the selected signal by multiplying the selected signal by $e^{j\Delta\Phi}$, where ΔΦ is the determined average phase difference and j is the imaginary unit.

* * * * *